US010603641B2

(12) United States Patent
Buechler et al.

(10) Patent No.: US 10,603,641 B2
(45) Date of Patent: Mar. 31, 2020

(54) DIESEL EXHAUST FLUID MIXING BODY USING VARIABLE CROSS-SECTION SWITCHBACK ARRANGEMENT

(71) Applicant: Cummins Emission Solutions, Inc., Columbus, IN (US)

(72) Inventors: John G. Buechler, Indianapolis, IN (US); Douglas A. Mitchell, Indianapolis, IN (US); Ryan M. Johnson, Cottage Grove, WI (US); James Goss, Greenwood, IN (US)

(73) Assignee: Cummins Emission Solutions, Inc., Columbus, IN (US)

( * ) Notice: Subject to any disclaimer, the term of this patent is extended or adjusted under 35 U.S.C. 154(b) by 0 days.

(21) Appl. No.: 16/277,657

(22) Filed: Feb. 15, 2019

(65) Prior Publication Data
US 2019/0176099 A1   Jun. 13, 2019

Related U.S. Application Data

(62) Division of application No. 15/520,527, filed as application No. PCT/US2015/054137 on Oct. 6, 2015, now Pat. No. 10,245,563.
(Continued)

(51) Int. Cl.
*B01F 3/04*   (2006.01)
*F01N 3/20*   (2006.01)
(Continued)

(52) U.S. Cl.
CPC ........ *B01F 3/04049* (2013.01); *B01F 5/0473* (2013.01); *B01F 5/0605* (2013.01);
(Continued)

(58) Field of Classification Search
None
See application file for complete search history.

(56) References Cited

U.S. PATENT DOCUMENTS

| | | |
|---|---|---|
| 3,186,807 A | 6/1965 | Bolek |
| 4,706,646 A | 11/1987 | Christianson et al. |
| (Continued) | | |

FOREIGN PATENT DOCUMENTS

DE   102005041733 A1 *  3/2007  ............ F01N 1/083

OTHER PUBLICATIONS

Zuschlag et al. DE102005041733A1—translated document (Year: 2005).*
(Continued)

*Primary Examiner* — Walter D. Griffin
*Assistant Examiner* — Jelitza M Perez
(74) *Attorney, Agent, or Firm* — Foley & Lardner LLP

(57) ABSTRACT

An aftertreatment system includes a filter configured to receive an exhaust gas and a selective catalytic reduction (SCR) system configured to treat the exhaust gas. A body mixer is disposed downstream of the filter and upstream of the SCR system. The body mixer includes a housing defining an internal volume and including at least a first passageway, a second passageway, and a third passageway. The first passageway receives a flow of the exhaust gas from the filter and directs the flow of the exhaust gas towards the second passageway. The second passageway redirects the flow in a second direction opposite the first direction towards the third passageway. The third passageway redirects the flow in a third direction opposite the second direction towards the SCR system. An injection port is disposed on a sidewall of the housing and configured to communicate an exhaust reductant into the internal volume.

2 Claims, 7 Drawing Sheets

Related U.S. Application Data

(60) Provisional application No. 62/067,168, filed on Oct. 22, 2014.

(51) Int. Cl.
*B01F 5/04* (2006.01)
*B01F 5/06* (2006.01)
*F01N 3/28* (2006.01)
*F01N 3/021* (2006.01)
*F01N 13/00* (2010.01)

(52) U.S. Cl.
CPC ............ *B01F 5/0606* (2013.01); *F01N 3/021* (2013.01); *F01N 3/2066* (2013.01); *F01N 3/2892* (2013.01); *F01N 13/009* (2014.06); *F01N 2240/20* (2013.01); *F01N 2610/02* (2013.01); *F01N 2610/1453* (2013.01); *Y02T 10/24* (2013.01)

(56) References Cited

U.S. PATENT DOCUMENTS

| | | | |
|---|---|---|---|
| 7,192,469 | B1 | 3/2007 | Rumell et al. |
| 2004/0128989 | A1 | 7/2004 | Watanabe et al. |
| 2008/0066451 | A1 | 3/2008 | Warner et al. |
| 2009/0229254 | A1* | 9/2009 | Gibson ................ B01F 5/0603 60/282 |
| 2010/0139258 | A1 | 6/2010 | Hackett et al. |
| 2010/0199645 | A1 | 8/2010 | Telford |
| 2010/0242450 | A1* | 9/2010 | Werni .................. F01N 3/2066 60/297 |

OTHER PUBLICATIONS

International Search Report and Written Opinion issued for PCT/US2015/054137, dated Dec. 31, 2015, 10 pages.

\* cited by examiner

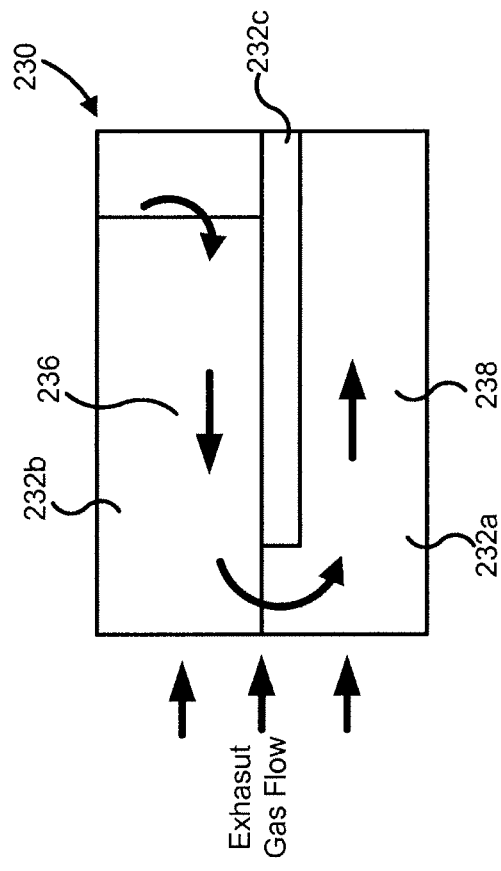
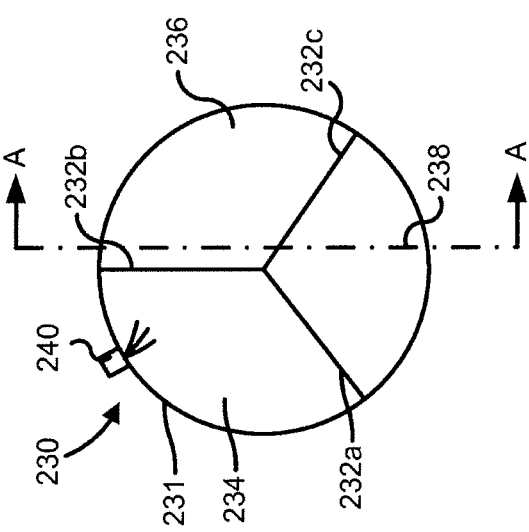

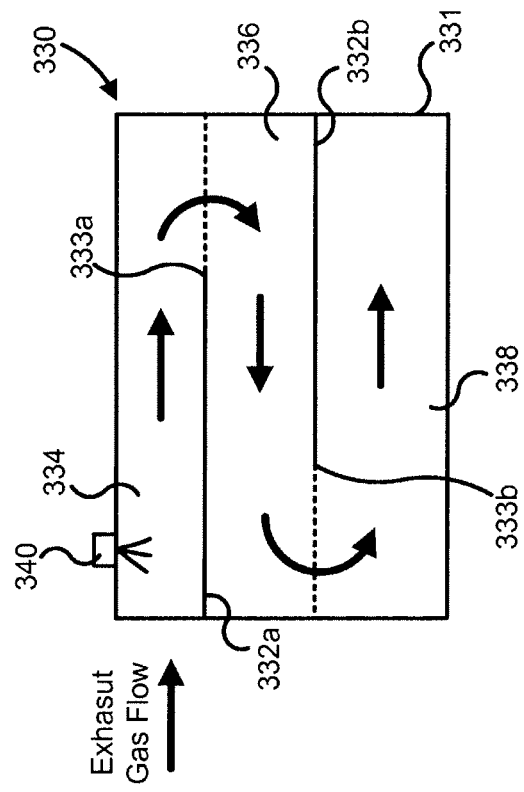
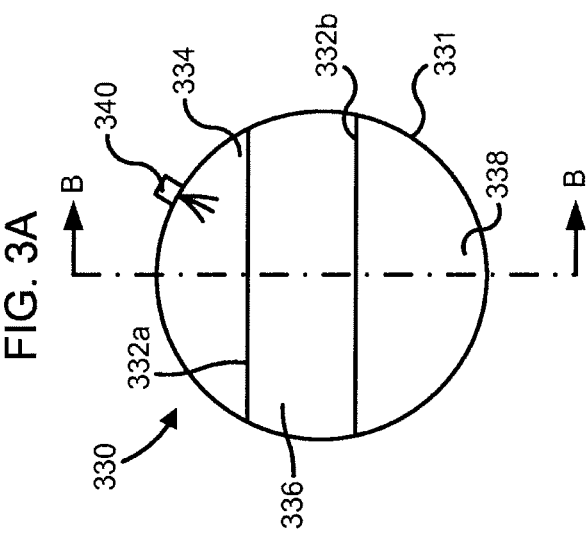

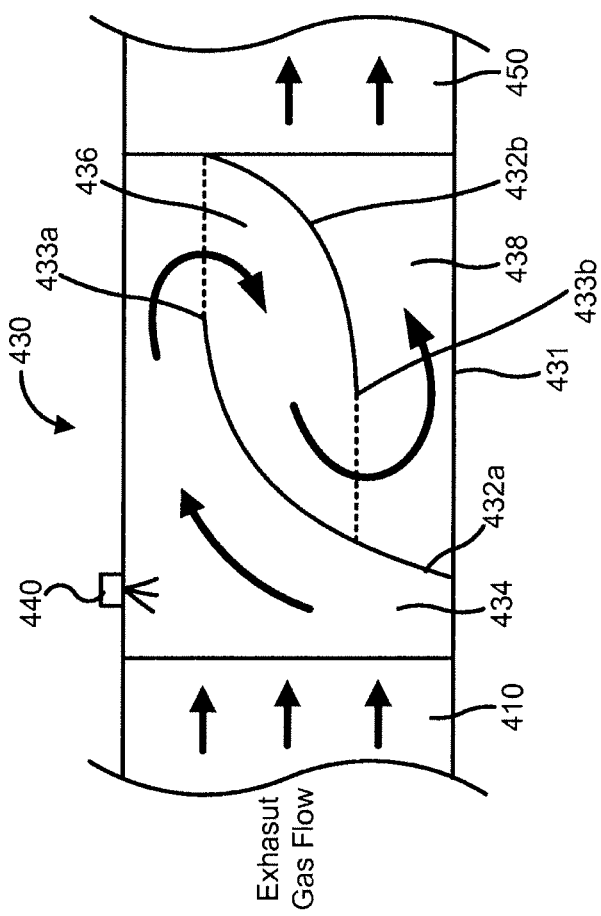

DIESEL EXHAUST FLUID MIXING BODY USING VARIABLE CROSS-SECTION SWITCHBACK ARRANGEMENT

CROSS REFERENCE TO RELATED APPLICATIONS

The present application is a divisional of U.S. patent application Ser. No. 15/520,527, filed Apr. 20, 2017, which is a National Stage application of PCT Application No. PCT/US2015/054137, filed Oct. 6, 2015, which claims the benefit of priority to U.S. Provisional Patent Application No. 62/067,168, filed Oct. 22, 2014 The contents of all three applications are hereby incorporated by reference in their entireties.

TECHNICAL FIELD

The present disclosure relates generally to exhaust aftertreatment systems for use with internal combustion (IC) engines.

BACKGROUND

During the combustion process in an IC engine (e.g., a diesel-powered engine), sulfur is concurrently formed with carbon monoxide (CO) and hydrocarbons (HC) as various sulfur oxides ($SO_x$). Typically, 97-99% of the total amount of $SO_x$ present in exhaust gas includes sulfur dioxide ($SO_2$) and 1-3% includes sulfur trioxide ($SO_3$). Thus, fuels with higher sulfur content tend to produce higher amounts of $SO_3$. For example, fuel with sulfur content of 1000 ppm may form approximately 1-3 ppm $SO_3$.

Exhaust aftertreatment systems are used to receive and treat exhaust gas generated by IC engines. Conventional exhaust gas aftertreatment systems include any of several different components to reduce the levels of harmful exhaust emissions present in exhaust gas. For example, certain exhaust aftertreatment systems for diesel-powered IC engines include a selective catalytic reduction (SCR) catalyst to convert $NO_x$ (NO and $NO_2$ in some fraction) into harmless nitrogen gas ($N_2$) and water vapor ($H_2O$) in the presence of ammonia ($NH_3$). Generally in such conventional aftertreatment systems, an exhaust reductant, (e.g., a diesel exhaust fluid such as urea) is injected into the aftertreatment system to provide a source of ammonia, and mixed with the exhaust gas to partially reduce the SOx and/or the NOx gases. The reduction byproducts of the exhaust gas are then fluidically communicated to the catalyst included in the SCR aftertreatment system to decompose substantially all of the SOx and NOx gases into relatively harmless byproducts which are expelled out of such conventional SCR aftertreatment systems.

$SO_3$ can react with ammonia to produce ammonium sulfate (($NH_4)_2SO_4$) and ammonium bisulfate ($NH_4HSO_4$). In conventional selective catalytic reduction systems for aftertreatment of exhaust gas (e.g., diesel exhaust gas) urea is often used as a source of ammonia for reducing SOx and NOx gases included in the exhaust gas of IC engines (e.g., diesel exhaust gas). The urea or any other source of ammonia communicated into conventional aftertreatment systems can be deposited on sidewalls and/or components of the aftertreatment system. Furthermore, the efficiency of the aftertreatment system can depend on the mixing of the exhaust reductant with the exhaust gas, the temperature of the exhaust gas, and/or the backpressure experienced by the exhaust gas.

SUMMARY

Embodiments described herein relate generally to exhaust aftertreatment systems for use with IC engines, and in particular to exhaust aftertreatment systems that include a body mixer for mixing an exhaust reductant with an exhaust gas. In some embodiments, an aftertreatment system includes a filter configured to receive an exhaust gas and substantially remove any particulate from the exhaust gas as it flows through the filter. The aftertreatment system also includes a selective catalytic reduction (SCR) system positioned downstream of the filter and configured to treat the exhaust gas flowing through the SCR system. A body mixer is disposed downstream of the filter and upstream of the SCR system. The body mixer includes a housing defining an internal volume. The housing is structured to include at least a first passageway, a second passageway, and a third passageway. The first passageway is structured to receive a flow of the exhaust gas from the filter and direct the flow of the exhaust gas towards the second passageway. The second passageway is structured to redirect the flow in a second direction substantially opposite the first direction towards the third passageway. The third passageway is structured to redirect the flow in a third direction substantially opposite the second direction towards the SCR system. An injection port is disposed on a sidewall of the housing and configured to communicate an exhaust reductant into the internal volume.

In some embodiments, the body mixer is configured to mix the exhaust reductant with the exhaust gas as the exhaust gas flows through the first passageway, the second passageway, and the third passageway. In one embodiment, a first partition wall and a second partition wall are disposed in the internal volume defined by the aftertreatment system, and are oriented to define the first passageway, the second passageway and the third passageway. In another embodiment, the first partition wall and the second partition wall are disposed substantially parallel to each other. In yet another embodiment, the first partition wall and the second partition wall are substantially arcuate.

In another set of embodiments, a mixer for use in an aftertreatment system for mixing a reductant inserted into the aftertreatment system with an exhaust gas flowing through the aftertreatment system comprises a housing defining an internal volume. The housing defines at least a first passageway, a second passageway and a third passageway. The first passageway is structured to receive a flow of the exhaust gas and directs the flow in a first direction towards the second passageway. The second passageway is structured to redirect the flow in a second direction substantially opposite the first direction towards the third passageway. The third passageway is structured to redirect the flow in a third direction substantially opposite the second direction towards an outlet of the housing. An injection port is defined on a sidewall of the housing and structured to allow a reductant to be inserted into the housing.

In yet another set of embodiments, a method of promoting mixing of a reductant with an exhaust gas flowing through an aftertreatment system including at least a SCR system comprises positioning a mixer upstream of the SCR system. The mixer includes a housing defining an internal volume. The housing includes at least a first passageway, a second passageway, a third passageway and an injection port defined on a sidewall of the housing proximate to the first passageway. A reductant is inserted into the first passageway via the injection port. An exhaust gas is flowed into the first passageway. The first passageway is structured to direct the flow in a first direction towards the second passageway. The second passageway is structured to redirect the flow in a second direction substantially opposite the first direction towards the third passageway. The third passageway is structured to redirect the flow in a third direction substantially opposite the second direction towards the SCR system.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

FIG. 2A is a front view of a body mixer, according to an embodiment, and FIG. 2B shows a side cross-section view of the body mixer of FIG. 2A taken along the line A-A.

FIG. 3A is a front view of a body mixer according to an embodiment, and FIG. 3B is a side cross-section view of the body mixer of FIG. 3A taken along the line B-B.

FIG. 4 is a side cross-section view of a body mixer, according to another embodiment.

Figure 1:
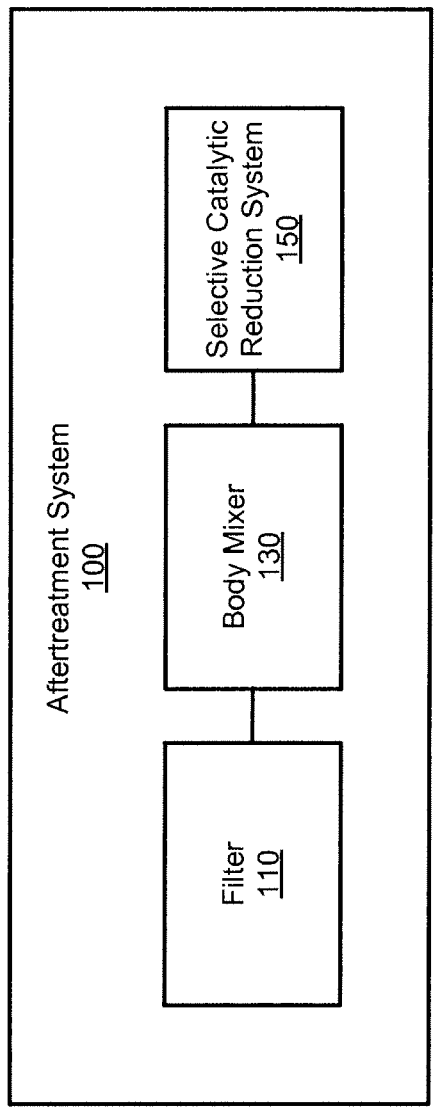
FIG. 1 is a schematic block diagram of an aftertreatment system that includes a body mixer, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to exhaust aftertreatment systems for use with IC engines, and in particular to exhaust aftertreatment systems that include a body mixer for mixing an exhaust gas with an exhaust reductant. Embodiments described herein may provide several advantages over conventional aftertreatment systems including, for example: (1) efficient mixing of an exhaust reductant (e.g., a diesel exhaust fluid such as urea) with an exhaust gas (e.g., a diesel exhaust gas) in a body mixer; (2) reducing exhaust reductant deposits (e.g., urea deposits) on a sidewall of the body mixer; (3) reducing a backpressure of the exhaust gas flowing through the aftertreatment system, thereby improving fuel economy and reducing operating cost; (4) increasing a residence time of the exhaust gas within the aftertreatment system allowing better mixing of the exhaust reductant with the exhaust gas; (5) reducing the space required for mixing of the exhaust gas with the exhaust reductant; (6) improving heat retention; and (7) reduction in overall cost.

FIG. 1 shows an aftertreatment system 100 for treating an exhaust gas (e.g., a diesel exhaust gas) produced by an IC engine (e.g., a diesel engine). The aftertreatment system 100 includes a filter 110, a body mixer 130, and a selective catalytic reduction (SCR) system 150.

The filter 110 is configured to receive a flow of an exhaust gas (e.g., a diesel exhaust gas) from an IC engine. The filter 110 can comprise any suitable filter (e.g., a diesel particulate filter) configured to filter and remove any particulates entrained within the exhaust gas flow, and prevent such particulates from entering the SCR system 150. Such particles can include, for example, dust, soot, organic particles, crystals, or any other solid particulates present in the exhaust gas. The filter 110 can include a housing made of a strong and rigid material such as, for example, high density polypropylene (HDPP) which can define an internal volume to house a filter element. Any suitable filter element can be used such as, for example, a cotton filter element, an acrylonitrile butadiene styrene (ABS) filter element, any other suitable filter element or a combination thereof. The filter element can have any suitable pore size, for example, about 10 microns, about 5 microns, or about 1 micron.

In some embodiments, the aftertreatment system 100 may not include the filter 110. In such embodiments, a diesel oxidation catalyst (DOC) can be included in the aftertreatment system 100 in place of the filter 110. In other embodiments, the aftertreatment system 100 may not include a filter or the DOC and may be only include the SCR system 150. In such embodiments, an exhaust pipe tube, pipe, or otherwise manifold coupled to an outlet of the IC engine can be directly coupled to an inlet of the body mixer 130, and the SCR system 150 can be downstream of the body mixer 130. In still other embodiments, the aftertreatment system 100 can include the DOC, the filter and/or any other suitable aftertreatment components.

The body mixer 130 or mixer 130 is disposed downstream of the filter 110 and upstream of the SCR system 150, and fluidically couples the filter 110 to the SCR system 150. The body mixer 130 includes a housing which defines an internal volume. The housing can be formed from a rigid, heat resistant, and/or corrosion resistant material. Suitable materials can include, without limitation, metals (e.g., stainless steel, iron, aluminum, alloys, etc.), ceramics, any other suitable material or a combination thereof. The housing can define a circular, square, rectangular, polygonal, oval, or any other suitable cross section. Furthermore, the length of the housing along the flow direction of the exhaust gas can be varied to increase or decrease the residence time of the exhaust gas within the body mixer 130.

The housing includes an inlet to receive the exhaust gas form the filter 110, and an outlet to deliver the exhaust gas to the SCR system 150. In some embodiments, the inlet and the outlet can have substantially the same cross-section (e.g., width or diameter). In other embodiments, the outlet can have a larger cross-section than the inlet, for example, when the SCR system 150 has a larger cross-section than the filter 110. In some embodiments, the outlet can have a large cross-section to serve as a diffuser, for example, to reduce a flow velocity of the exhaust gas into the SCR system 150. This can, for example, reduce the back pressure experienced by the exhaust gas flowing through the SCR system 150.

The housing is structured to include at least a first passageway, a second passageway, and a third passageway. In other embodiments, the housing of the body mixer 130 can be structured to include even more passageways, for example, four, five, six or even more passageways. The passageways can be defined in the housing using any suitable means. In some embodiments, a first partition wall and a second partition wall can be disposed in the inner volume defined by the housing. The first partition wall and the second partition wall can be oriented to define the first passageway, the second passageway, and the third passageway. In one embodiment, the first passageway and the second passageway can be disposed substantially parallel to each other. In other embodiments, the first partition wall and the second partition wall can be substantially arcuate. In yet other embodiments, the first partition wall and the second partition wall can be substantially non-arcuate, and disposed and oriented at a non-zero angle with respect to the inlet flow direction.

The first passageway is structured to receive a flow of exhaust gas from the filter 110 and direct the flow in a first direction towards the second passageway. In some embodiments, the flow in the first direction can be substantially parallel to, or otherwise in line with an inlet flow direction of the exhaust gas into the first passageway, for example, when the first passageway is defined substantially parallel to the inlet flow. In such embodiments, the first partition wall can be disposed substantially parallel to the direction of flow. In other embodiments, the flow in the first direction can be orthogonal to the inlet flow direction, for example when the first partition wall is disposed orthogonal to the inlet flow direction. In yet another embodiment, the first passageway can be curved, for example, when the first partition wall is arcuate. In such embodiments, the flow in the first direction can substantially normal to the inlet flow and continuously change direction while flowing through the first passageway The second passageway is structured to redirect the exhaust gas flow in a second direction that is different than first direction, and towards the third passageway. For example, the exhaust gas flow can experience a change in direction of the flow of greater than about 90 degrees (e.g., about 100 degrees, 110 degrees, 120 degrees, 130 degrees, 140 degrees, 150 degrees, 160 degrees, 170 degrees, or about 180 degrees) on entering the second passageway.

The third passageway is structured to redirect the flow in a third direction that is different than the second direction towards the SCR system 150. For example, the exhaust gas flow can experience a change in direction of the flow of greater than about 90 degrees (e.g., about 100 degrees, 110 degrees, 120 degrees, 130 degrees, 140 degrees, 150 degrees, 160 degrees, 170 degrees, or about 180 degrees) on entering the third passageway from the second passageway.

As described herein, the first passageway, the second passageway, the third flow passageway define a single seamless flow path for the exhaust gas to flow through the body mixer 130. In some embodiments, the transition from the first passageway to the second passageway, and/or from the second passageway to the third passageway can be defined by a change in direction of the exhaust gas flow of greater than about 90 degrees (e.g., about 100 degrees, 110 degrees, 120 degrees, 130 degrees, 140 degrees, 150 degrees, 160 degrees, 170 degrees, or about 180 degrees). In other words, in such embodiments the second passageway starts at a location within the internal volume where the exhaust gas flow travelling through the first passageway experiences a change in flow direction of great than about 90 degrees. Similarly, the third passageway starts at a location within the internal volume where the exhaust gas flow travelling through the second passageway experiences a change in flow direction of great than about 90 degrees.

In other embodiments, the transition from the first passageway to the second passageway, and/or from the second passageway to the third passageway can be defined by the partition walls. For example, the first passageway can be defined as the portion of the internal volume defined by a surface of a sidewall of the housing, and a first surface of the first partition wall. Furthermore, a portion of the internal volume that would have been bounded by the first surface of the first partition wall, if the partition wall extended from a first sidewall of the housing to a second sidewall of the housing (or a surface of the second partition wall) can also be included in the first passageway. The second passageway and the third passageway can be similarly defined. These concepts will be understood more clearly with respect to the specifications of the specific embodiments describe herein.

An injection port is disposed on a sidewall of the housing of the body mixer 130. The injection port is configured to communicate an exhaust reductant into the internal volume. For example, the injection port can be disposed in a sidewall which defines the first passageway. The exhaust reductant can thus be communicated into the first passageway. The body mixer is configured to mix the exhaust gas with the exhaust reductant as the exhaust gas flows through the first passageway, the second passageway, and thereon to the third passageway. The body mixer can thus increase the residence time of the exhaust gas and the exhaust reductant within the internal volume defined by the body mixer 130. This can enable efficient mixing of the exhaust reductant with the exhaust gas, reduce backpressure, reduce exhaust reductant deposits (e.g., urea deposits) within the body mixer, and or maintain a temperature of the exhaust gas as it flows through the body mixer 130 in the SCR system 150.

In some embodiments, the exhaust gas can include a diesel exhaust gas and the exhaust reductant can include a diesel exhaust fluid. The diesel exhaust fluid can include urea, an aqueous solution of urea, or any other fluid that includes ammonia, by products, or any other diesel exhaust fluid as is known in the arts (e.g., the diesel exhaust fluid marketed under the name ADBLUE®).

The SCR system 150 is configured to treat an exhaust gas (e.g., a diesel exhaust gas) flowing through the SCR system 150. The exhaust reductant reacts with the exhaust gas to at least partially reduce one or more components of the gas (e.g., SOx and NOx), or facilitate reduction of the one or more components in the presence of one or more catalysts.

The SCR system 150 includes one or more catalysts formulated to selectively reduce the exhaust gas. Any suitable catalyst can be used such as, for example, platinum, palladium, rhodium, cerium, iron, manganese, copper, vanadium based catalyst, any other suitable catalyst, or a combination thereof. The catalyst can be disposed on a suitable substrate such as, for example, a ceramic (e.g., cordierite) or metallic (e.g., kanthal) monolith core which can, for example, define a honeycomb structure. A washcoat can also be used as a carrier material for the catalysts. Such washcoat materials can include, for example, aluminum oxide, titanium dioxide, silicon dioxide, any other suitable washcoat material, or a combination thereof. The exhaust gas (e.g., diesel exhaust gas) can flow over and about the catalyst such that any SOx or NOx gases included in the exhaust gas are further reduced to yield an exhaust gas which is substantially free of carbon monoxide, SOx and NOx gases.

In some embodiments, the body mixer can include passageways that have cross-sections defining a sector of a circle. For example, FIG. 2A shows a front view, and FIG. 2B shows a side cross section view of a body mixer or mixer 230 which can be included in an aftertreatment system, for example, the aftertreatment system 100 or any other aftertreatment system described herein.

The body mixer includes a housing 231 defining an internal volume. The housing 231 defines a circular cross-section, but can be configured to define any other cross-section (e.g., square, rectangular, polygonal, oval, etc.). A first partition wall 232a, a second partition wall 232b, and a third partition wall 232c (collectively referred to as "partition walls 232) are disposed in the internal volume. The partition walls 232 are disposed and oriented to define a first passageway 234, a second passageway 236, and third passageway 238. The first passageway 234, the second passageway 236, and the third passageway 238 are in fluidic communication with each other and define a continuous flow path for the exhaust gas to flow. As shown in FIG. 2A, each of the first passageway 234, the second passageway 236, and the third passageway 238 is structured to have a cross-section which resembles a sector of a circle.

As shown in FIG. 2A, a first partition wall first end of the first partition wall 232a, a second partition wall first end of the second partition wall 232b and a third partition wall first end of the third partition wall 232c are in contact with each other proximate to a central axis of the housing 231. The first partition wall 232a, the second partition wall 232b and the third partition wall 232c extend away from the central axis and each other so that a first partition wall second end of the first partition wall 232a, a second partition wall second end of the second partition wall 232b and a third partition wall second end of the third partition wall 232c are in contact with a sidewall of the housing 231 at different locations, thereby dividing the housing into the first passageway, the second passageway and the third passageway.

An injection port 240 is disposed on a sidewall of the body mixer 230 which defines the first passageway 234. The injection port 240 is configured to communicate an exhaust reductant (e.g., a diesel exhaust fluid such as urea) into the first passageway 234 and allow mixing of the exhaust reductant with the exhaust gas as it flows through the body mixer.

The first passageway 234 is structured to receive a flow of exhaust, for example, from a filter (e.g., the filter 110) and direct the flow in a first direction towards the second passageway 236, as shown in FIG. 2B. The second passageway 236 is structured to redirect the exhaust gas flow in a second direction different than the first direction, and towards the third passageway 238. As shown in FIG. 2B, the exhaust gas can experience a change in direction of the flow of exhaust gas of greater than about 90 degrees as it enters the second passageway 236. In particular embodiments, the second direction may be substantially opposite the first direction.

The third passageway 238 is structured to redirect the flow of exhaust gas in a third direction that is different than the second direction. For example, the exhaust gas flow can experience a change in direction of greater than about 90 degrees as it enters the third passageway 238. In particular embodiments, the third direction may be substantially opposite the second direction. The third passageway 238 can be in fluidic communication with an SCR system (e.g., the SCR system 150) and communicate the exhaust gas mixed with the reductant to the SCR system.

In some embodiments, a body mixer can include partition walls that define passageways, and are disposed parallel to a direction of flow of an exhaust gas. For example, FIG. 3A shows a front view, and FIG. 3B shows a side cross-section view of a body mixer or mixer 330. The body mixer 330 can be included in an aftertreatment system, for example, the aftertreatment system 100, or any other aftertreatment system described herein.

The body mixer includes a housing 331 defining an internal volume. The housing 331 defines a circular cross-section, but can be configured to define any other cross-section (e.g., square, rectangular, polygonal, oval, etc.). A first partition wall 332a and a second partition wall 332b (collectively referred to as "partition walls 332) are disposed in the internal volume. Each partition wall 332 is disposed parallel to a direction of exhaust gas flow but in different planes, so that the first partition wall 332a and the second partition wall 332b are parallel to each other. The partition walls 332 are disposed and oriented to define a first passageway 334, a second passageway 336, and third passageway 338. The first passageway 334, the second passageway 336, and the third passageway 338 are in fluidic communication with each other and define a continuous flow path for the exhaust gas to flow.

As shown in FIG. 3B, a first end of the first partition wall 332a or first partition wall first end is in contact or otherwise flush with a first sidewall of the housing 331. A second end 333a of the first partition wall 332a or first partition wall second end is distal from a second sidewall of the housing 331 opposite the first sidewall. In contrast, a first end of the second partition wall 332b or second partition wall first end is in contact or otherwise flush with the second sidewall of the housing 331. A second end 333b of the second partition wall 332b or second partition wall second end is distal from the first sidewall of the housing 331. Furthermore, each partition wall has a length such that the partition walls 332 partially overlap to define each passageway. The dotted lines shown in FIG. 3B are for context only and meant to show the boundary of each passageway.

An injection port 340 is disposed on a sidewall of the body mixer 330 which defines the first passageway 334. The injection port 340 is configured to communicate an exhaust reductant (e.g., a diesel exhaust fluid such as urea) into the first passageway 334 and allow mixing of the exhaust reductant with the exhaust gas as it flows through the body mixer.

The first passageway 334 is structured to receive a flow of exhaust, for example, from a filter (e.g., the filter 110) and direct the flow in a first direction towards the second passageway 336, as shown in FIG. 3B. The exhaust reductant is injected into the first passageway 334 and mixes with the exhaust gas as it flows through each passageway. The second passageway 336 is structured to redirect the exhaust gas flow in a second direction different than the first direction, and towards the third passageway 338. As shown in FIG. 3B, the exhaust gas flow can experience a change in direction of greater than about 90 degrees as it enters the second passageway 336. In particular embodiments, the second direction may be substantially opposite the first direction.

The third passageway 338 is structured to redirect the flow of exhaust gas in a third direction different than the second direction. For example, the exhaust gas flow can experience a change in direction of greater than about 90 degrees as it enters the third passageway 338. In particular embodiments, the third direction may be substantially opposite the second direction. The third passageway 338 can be in fluidic communication with an SCR system (e.g., the SCR system 150) and communicate the exhaust gas mixed with the reductant to the SCR system.

In some embodiments, a body mixer can include arcuate partition walls. For example, FIG. 4 shows a side cross-section view of a body mixer or mixer 430. The body mixer 430 can be included in an aftertreatment system, for example, the aftertreatment system 100, or any other aftertreatment system described herein.

The body mixer includes a housing 431 defining an internal volume. The housing 431 can define a suitable cross-section, for example, circular, square, rectangular, polygonal, oval, or any other suitable cross-section. A first partition wall 432a and a second partition wall 432b (collectively referred to as "partition walls 432) are disposed in the internal volume. The partition walls 432 are substantially arcuate. The partition walls 432 are disposed and oriented to define a first passageway 434, a second passageway 436, and third passageway 438. The first passageway 434, the second passageway 436, and the third passageway 438 are in fluidic communication with each other and define a continuous flow path for the exhaust gas to flow.

As shown in FIG. 4, a first end of the first partition wall 432a or first partition wall first end is in contact or otherwise flush with a first sidewall of the housing 431. A second end 433a of the first partition wall 432a or first partition wall second end 433a is distal from a second sidewall of the housing 431 and the first sidewall. The second sidewall is orthogonal to the first sidewall (e.g., oriented at an angle of 75, 80, 85, 90, 95, 100 or 105 degrees with respect to the first sidewall. In contrast, a first end of the second partition wall 432b or second partition wall first end is in contact or otherwise flush with the second sidewall of the housing 431. A second end 433b of the second partition wall 432b or second partition wall second end 433b is distal from the first sidewall of the housing 431. Each of the partition walls 432 have an arc length such that the partition walls 432 partially overlap to define each passageway. The dotted lines shown in FIG. 4 are for context only and meant to show the boundary of each passageway.

An injection port 440 is disposed on a sidewall of the body mixer 430 which defines the first passageway 434. The injection port 440 is configured to communicate an exhaust reductant (e.g., a diesel exhaust fluid such as urea) into the first passageway 434 and allow mixing of the exhaust reductant with the exhaust gas as it flows through the body mixer.

The first passageway 434 is structured to receive a flow of exhaust, for example, from a filter 410 and direct the flow in a first direction towards the second passageway 436, as shown in FIG. 4. The filter 410 can be substantially similar to the filter 110 and is therefore, not described in further detail herein. As described herein, the first partition wall 432a is substantially arcuate. Thus the first passageway 434, which is at least partially defined by a first sidewall of the housing 431, and a sidewall of the first partition wall 432a, defines a substantially curved flow path. The exhaust reductant is injected into the first passageway 434 and mixes with the exhaust gas as it flows through each passageway.

The second passageway 436 is structured to redirect the exhaust gas flow in a second direction different than the first direction, and towards the third passageway 438. The second partition wall 432b is also arcuate such that the second passageway 436, which is at least partially defined by the sidewall of the first partition wall 432a and a sidewall of the second partition wall 432b, defines a curved flow path. As shown in FIG. 4, the exhaust gas flow can experience a change in direction of greater than about 90 degrees as it enters the second passageway 436 from the first passageway. In particular embodiments, the second direction may be substantially opposite the first direction.

The third passageway 438 is structured to redirect the flow of exhaust gas in a third direction different than the second direction. For example, the exhaust gas flow can experience a change in direction of greater than about 90 degrees as it enters the third passageway 438. In particular embodiments, the third direction may be substantially opposite the second direction. The third passageway 438, which is at least partially defined by the sidewall of the second partition wall 432b and a second sidewall of the housing 431, defines a curved flow path for the exhaust gas to flow. The curved flow paths of each of the first passageway 434, the second passageway 436, and the third passageway 438 can, for example, create vortices or changes in velocity of the exhaust gas and thereby, enhance the mixing of the exhaust gas with the exhaust reductant. The third passageway 438 can be in fluidic communication with an SCR system 450 and communicate the exhaust gas mixed with the reductant to the SCR system 450. The SCR system 450 can be substantially similar to the SCR system 150 and is therefore, not described herein further detail herein.

In some embodiments, a body mixer can include arcuate partition walls which do not overlap. For example, FIG. 5 shows a side cross-section view of a body mixer or mixer 530 which can be used in an aftertreatment system, for example, the aftertreatment system 100 or any other aftertreatment system described herein.

The body mixer 530 includes a housing 531 defining an internal volume. The housing 531 can be substantially similar to the housing 531 and is therefore not described in further detail herein. An injection port 540 is disposed on a sidewall of the body mixer 530 which defines a first passageway 534 (as described herein). The injection port 540 is configured to communicate an exhaust reductant (e.g., a diesel exhaust fluid such as urea) into the first passageway 534 and allow mixing of the exhaust reductant with the exhaust gas as it flows through the body mixer.

A first partition wall 532a and a second partition wall 532b (collectively referred to as "partition walls 532) are disposed in the internal volume. The partition walls 532 are substantially arcuate. The partition walls 532 are disposed and oriented to define a first passageway 534, a second passageway 536, and third passageway 538. The first passageway 534, the second passageway 536, and the third passageway 538 are in fluidic communication with each other and define a continuous flow path for the exhaust gas to flow.

Figure 5:
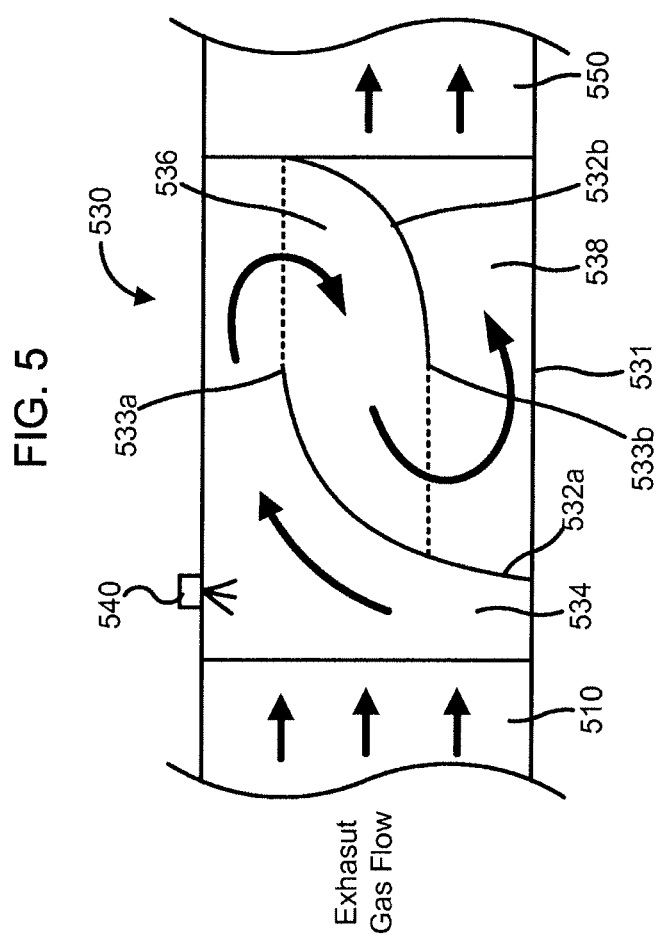
FIG. 5 is a side cross-section view of a body mixer, according to a yet another embodiment.

As shown in FIG. 5, a first end of the first partition wall 532a or first partition wall first end is in contact or otherwise flush with a first sidewall of the housing 531. A second end 533a of the first partition wall 532a or first partition wall second end 533a is distal from a second sidewall of the housing 531. In contrast, a first end of the second partition wall 532b or second partition wall first end is in contact or otherwise flush with the second sidewall of the housing 531. A second end 533b of the second partition wall 532b or second partition wall second end 533b is distal from the first sidewall of the housing 531. Each of the partition walls 532 have an arc length such that the partition walls 532 do not overlap. The dotted lines shown in FIG. 5 are for context only and meant to show the boundary of each passageway.

The first passageway 534 is configured to receive a flow of exhaust gas from a filter 510, which can be substantially similar to the filter 110. The first passageway 534 directs the exhaust gas flow in a first direction towards the second passageway 536. The second passageway 536 redirects the exhaust gas flow in a second direction different than the first direction towards the third passageway 538, as described with respect to the second passageway 436 included in the body mixer 430. Similarly, the third passageway 538 redirects the exhaust gas flow in a third direction is different than the second direction towards an SCR system 550, as described with respect to the third passageway 438 included in the body mixer 430. In particular embodiments, the second direction may be substantially opposite the first direction, and the third direction may be substantially opposite the second direction.

Since there is no overlap between the partition walls 532, the entrance of the second passageway 536 and the third passageway 538 can have a larger cross-section or otherwise cross-sectional area for the exhaust gas to enter. This can result in a decrease in velocity of the exhaust gas mixed with the exhaust reductant as it enters from the first passageway 534 to the second passageway 536, and/or from the second passageway 536 to the third passageway 538. In this manner, a residence time of the exhaust gas and exhaust reductant mixture in the body mixer 530 can be increased, mixing can be enhanced, and/or backpressure can be reduced.

In some embodiments, a body mixer can include arcuate partition walls structured to provide a gradual change or otherwise smooth change in direction of an exhaust gas flowing through the body mixer. For example, FIG. 6 shows a side cross-section view of a body mixer or mixer 630 which can be used in an aftertreatment system, for example, the aftertreatment system 100 or any other aftertreatment system described herein.

The body mixer 630 includes a housing 631 defining an internal volume. The housing 631 can be substantially similar to the housing 431 and is therefore, not described in further detail herein. An injection port 640 is disposed on a sidewall of the body mixer 630 which defines a first passageway 634 (as described herein). The injection port 640 is configured to communicate an exhaust reductant (e.g., a diesel exhaust fluid such as urea) into the first passageway 634 and allow mixing of the exhaust reductant with the exhaust gas as it flows through the body mixer.

A first partition wall 632a and a second partition wall 632b (collectively referred to as "partition walls 632) are disposed in the internal volume. The partition walls 632 are substantially arcuate. The partition walls 632 are disposed and oriented to define a first passageway 634, a second passageway 636, and third passageway 638. The first passageway 634, the second passageway 636, and the third passageway 638 are in fluidic communication with each other and define a continuous flow path for the exhaust gas to flow.

Figure 6:
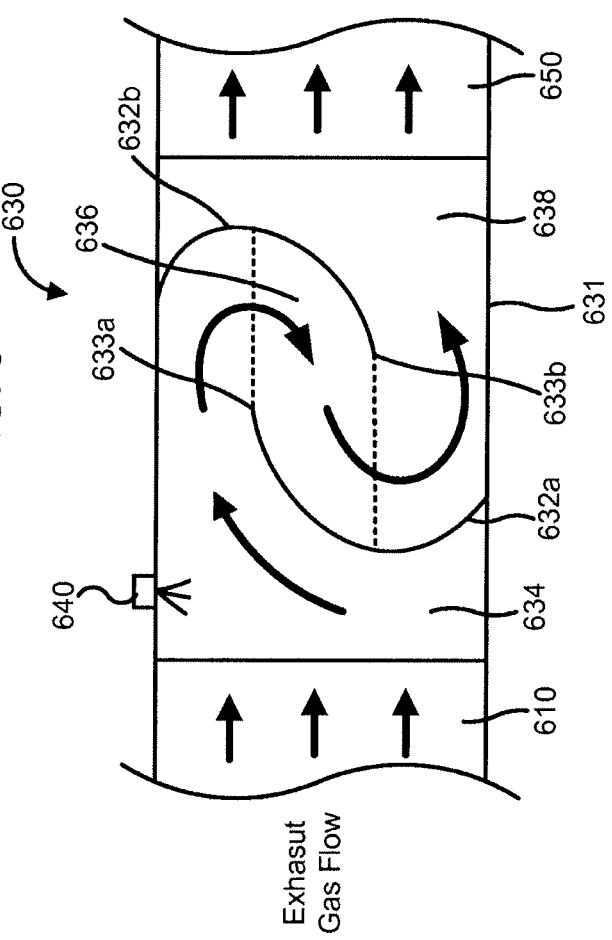
FIG. 6 is a side cross-section view of a body mixer, according to a still another embodiment.

As shown in FIG. 6, a first end of the first partition wall 632a or first partition wall first end is in contact or otherwise flush with a first sidewall of the housing 631. A second end 633a of the first partition wall 632a or first partition wall second end 633a is distal from a second sidewall of the housing 631 which is opposite the first sidewall. In contrast, a first end of the second partition wall 632b or second partition wall first end is in contact or otherwise flush with the second sidewall of the housing 631. A second end 633b of the second partition wall 632b or second partition wall second end 633b is distal from the first sidewall of the housing 631. Each of the partition walls 632 have an arc length such that the partition walls 632 do not overlap, as shown in FIG. 6. In other embodiments, the partition walls 632 can have arc lengths such that the partition walls 632 at least partially overlap. The dotted lines shown in FIG. 6 are for context only and meant to show the boundary of each passageway.

The first passageway 634 is configured to receive a flow of exhaust gas from a filter 610, which can be substantially similar to the filter 610. The first passageway 634 directs the exhaust gas flow in a first direction towards the second passageway 636. The second passageway 636 redirects the exhaust gas flow in a second direction that is different than the first direction towards the third passageway 638, as described with respect to the second passageway 436 included in the body mixer 430. Similarly, the third passageway 638 redirects the exhaust gas flow in a third direction that is different than the second direction towards an SCR system 650, as described with respect to the third passageway 438 included in the body mixer 430. Again, in particular embodiments the second direction is substantially opposite the first direction, and the third direction is substantially opposite the second direction.

The partition walls 632 are structured to have an arcuate surface that provides a gradual or otherwise smooth change in direction for the exhaust gas flow. As shown in FIG. 6, a portion of the second partition wall 632b proximal to the first end of the second partition wall 632b gradually curves away from the second sidewall of the housing 631. Similarly, a portion of the first partition wall 632a proximal to the first end of the first partition wall 632a gradually curves away from the first sidewall of the housing 631. Thus, there are no sharp corners or turns, which can allow the exhaust gas mixed with the exhaust reductant to gradually and smoothly change direction as it flows from the first passageway 634 to the second passageway 636, and thereon to the third passageway 638. This can reduce turbulence in the flow and thereby decrease backpressure.

In some embodiments, a body mixer can include partition walls that include a plurality of small openings, holes, or slots (not shown) defined through the partition walls. For example, the partition walls included in any of the body mixers 130, 230, 330, 430, 530, 630 or any other body mixer described herein can include small openings, slots etc. (not shown) defined through the partitions walls. Such openings can allow a small portion of an exhaust gas to pass through received by the body mixer to pass through the holes into the adjacent passageways. The bulk of the exhaust gas, however, will still flow through the passageways (e.g., a first passageway, a second passageway, and a third passageway) of the body mixer to the SCR system coupled to the body mixer. The openings, slots, etc. can provide a number of benefits in certain implementations such as enabling lower backpressure and providing improved mixing of reductant.

Figure 7:
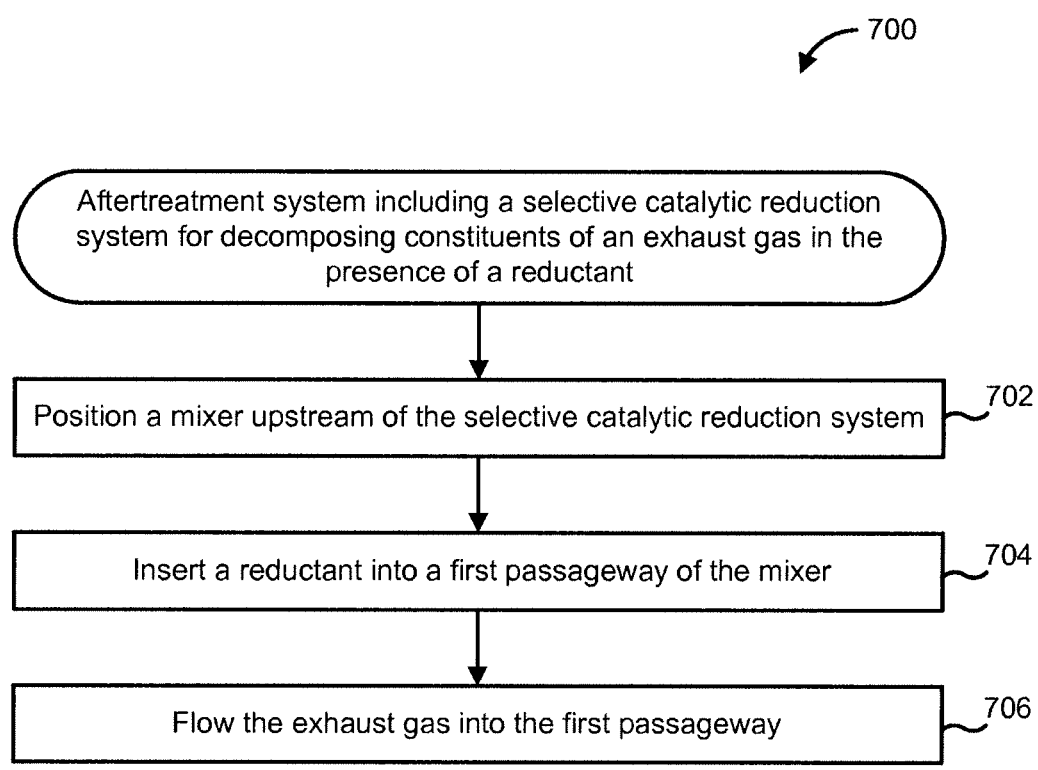
FIG. 7 is a schematic flow diagram of an embodiment of a method to facilitate mixing of a reductant with an exhaust gas using a mixer.

FIG. 7 is a schematic flow diagram of an example method 700 for promoting or facilitating mixing of a reductant (e.g., an aqueous urea solution) with an exhaust gas (e.g., a diesel exhaust gas) flowing through an aftertreatment system, such as the aftertreatment system 100, which includes at least a SCR system (e.g., the SCR system 150). Better mixing of the reductant with the exhaust gas can increase a catalytic conversion efficiency (e.g., NOx conversion efficiency of the SCR system, thereby reducing NOx emissions.

The method 700 includes positioning a mixer upstream of the SCR system at 702. The mixer includes a housing defining an internal volume. The housing includes at least a first passageway, a second passageway, a third passageway and an injection port defined on a sidewall of the housing proximate to the first passageway. For example, the mixer can include the mixer 130, 230, 330, 430, 530, 630 or any other mixer described herein. In various embodiments, the mixer includes a first partition wall and a second wall positioned in the internal volume defined by the housing. The first partition wall and the second partition wall are oriented to define the first passageway and the second passageway. In some embodiments, the first partition wall and the second partition wall are positioned parallel to each other (e.g., the first partition wall 332a and the second partition wall 332b of the mixer 330, as described herein). In other embodiments, the first partition wall and the second partition wall are substantially arcuate (e.g., the first partition wall 432a, 532a or 632a and the second partition wall 432b, 532b or 632b of the mixer 430, 530 or 630).

A reductant is inserted into the first passageway at 704. For example, a reductant insertion unit (e.g., including pumps, valves, nozzles etc.) can be in fluid communication with the injection port for inserting the reductant (e.g., an aqueous urea solution) into the first passageway.

The exhaust gas is flowed into the first passageway at 706. In various embodiments, the reductant is inserted into the first passageway after the exhaust gas flow into the first passageway has initiated. The first passageway is structured to direct the flow of the exhaust gas in a first direction towards the second passageway. The second passageway is structured to redirect the flow of the exhaust gas in a second direction substantially opposite the first direction, for example a change in direction of the exhaust gas flow from the first direction to the second direction of greater than about 90 degrees (e.g., about 100 degrees, 110 degrees, 120 degrees, 130 degrees, 140 degrees, 150 degrees, 160 degrees, 170 degrees, or about 180 degrees) towards the third passageway.

The third passageway is structured to redirect the flow of the exhaust gas in a third direction substantially opposite the second direction, for example, a change in direction of the exhaust gas flow from the first direction to the second direction of greater than about 90 degrees (e.g., about 100 degrees, 110 degrees, 120 degrees, 130 degrees, 140 degrees, 150 degrees, 160 degrees, 170 degrees, or about 180 degrees) towards the SCR system. Flowing the exhaust gas through the first passageway, the second passageway and the third passageway increases the residence time of the exhaust gas in the mixer. The increase in residence time provides better mixing of the reductant inserted into the mixer with the exhaust gas which can contribute to increasing a catalytic conversion efficiency of the SCR system.

As used herein, the terms "about" and "approximately" generally mean plus or minus 10% of the stated value. For example, about 0.5 would include 0.45 and 0.55, about 10 would include 9 to 11, about 1000 would include 900 to 1100.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

What is claimed is:

1. A method of promoting mixing of a reductant with an exhaust gas flowing through an aftertreatment system including at least a selective catalytic reduction system, the method comprising:
    positioning a mixer upstream of the selective catalytic reduction system, the mixer including a housing defining an internal volume, the housing including at least a first passageway, a second passageway, a third passageway and an injection port defined on a sidewall of the housing proximate to the first passageway;
    inserting the reductant into the first passageway via the injection port; and
    flowing the exhaust gas through or past a first sidewall of the housing and into the first passageway, along a first partition wall of the mixer and a second partition wall of the mixer, and out of the first passageway and against a second sidewall of the housing so as to direct the exhaust gas in a first direction towards the second passageway;
    flowing the exhaust gas into the second passageway, along the second partition wall and a third partition wall of the mixer, and out of the second passageway and against the first sidewall of the housing so as to direct the exhaust gas in a second direction substantially opposite the first direction towards the third passageway;
    flowing the exhaust gas into the third passageway, along the first partition wall and the third partition wall, and out of the third passageway through the second sidewall.

2. The method of claim 1, wherein the first partition wall, the second partition wall, and the third partition wall are oriented to define the first passageway, the second passageway, and the third passageway.

* * * * *